United States Patent [19]

Gunther et al.

[11] Patent Number: 4,586,781
[45] Date of Patent: May 6, 1986

[54] DIFFRACTION OPTICS DIFFUSING SCREEN

[75] Inventors: John E. Gunther, Torrance; Ronald T. Smith, Redondo Beach, both of Calif.

[73] Assignee: Hughes Aircraft Company, Los Angeles, Calif.

[21] Appl. No.: 403,945

[22] Filed: Jul. 30, 1982

[51] Int. Cl.⁴ .............................................. G02B 5/32
[52] U.S. Cl. ..................... 350/3.7; 350/96.27
[58] Field of Search ................. 350/3.7, 96.27

[56] References Cited

U.S. PATENT DOCUMENTS

| | | | |
|---|---|---|---|
| 3,043,179 | 7/1962 | Dunn | 350/96.27 |
| 3,043,910 | 7/1962 | Hicks, Jr. | 350/96.27 |
| 3,580,655 | 5/1971 | Leith et al. | |
| 3,708,217 | 1/1973 | McMahon | |
| 3,907,403 | 9/1975 | Maeda | |
| 4,118,106 | 10/1978 | Leith | 350/96.25 |
| 4,189,207 | 2/1980 | Fisher et al. | 350/276 R |
| 4,215,924 | 8/1980 | Matsumoto | |

FOREIGN PATENT DOCUMENTS 1797475 9/1971 Fed. Rep. of Germany .
1574351 9/1980 United Kingdom .
1579214 11/1980 United Kingdom .

OTHER PUBLICATIONS

IBM Technical Disclosure Bulletin, vol. 23, No. 2, issued Jul. 1980, (New York)–G. T. Sincerboy et al., "System to Increase the Efficiency of the Holographs Energy Distribution for Individual Chip Replacement", pp. 831–832.

Primary Examiner—Bruce Y. Arnold
Attorney, Agent, or Firm—A. W. Karambelas

[57] ABSTRACT

Optical apparatus (48) includes the holographic optical element (16) which diffracts the incoming ray (15) in a diffuse cone toward a viewing pupil and at an angle parallel to the axis of fiber optic faceplate (48) so the central ray (17) of the diffused cone passes through optical fiber (54) toward the viewing pupil. This permits the zero-order undiffracted light in ray (25) to be absorbed in the fiber optic faceplate (48).

7 Claims, 5 Drawing Figures

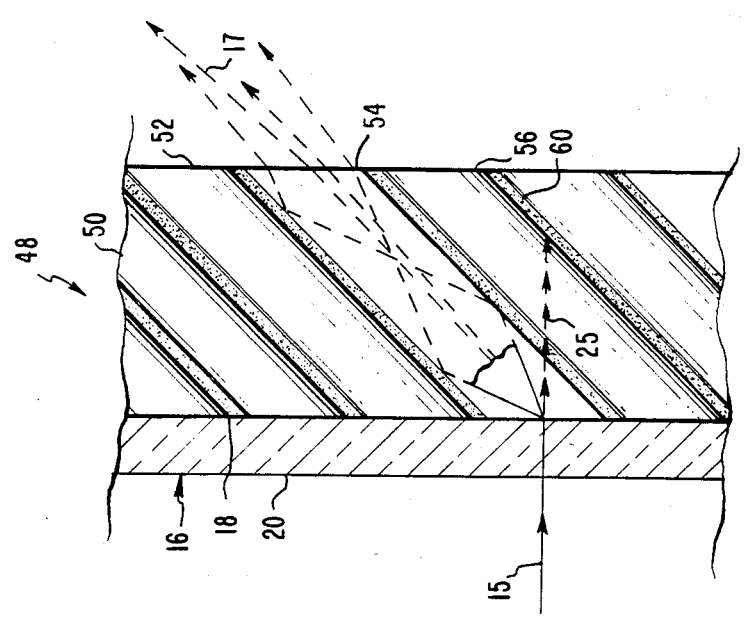
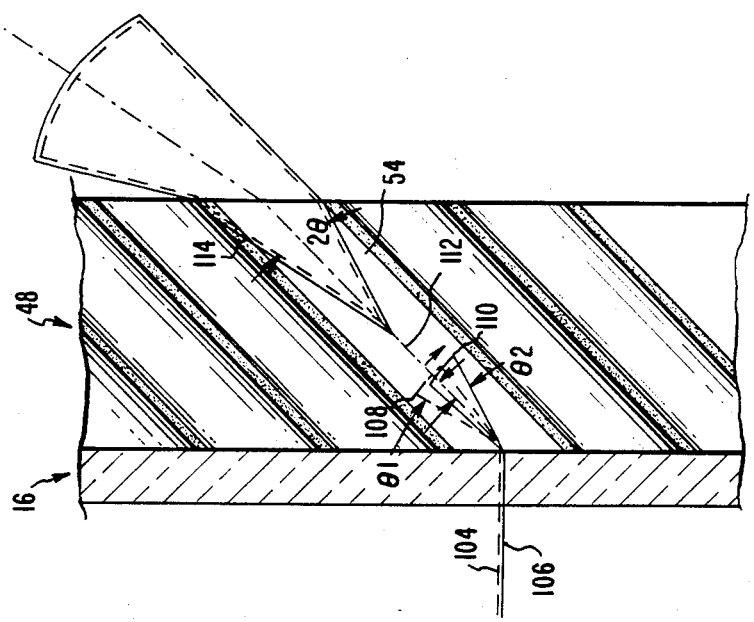

DIFFRACTION OPTICS DIFFUSING SCREEN

TECHNICAL FIELD

The optical energy to a viewer can be controlled across the viewing pupil by means of a diffraction optic viewing screen made by holographic optical element techniques. Such a screen can be combined with a fiber optic faceplate to suppress that portion of the original energy which was not diffracted by the diffraction optics diffusing screen. Similarly, colors which have been separated by such a diffusing screen can be recombined by such a fiber optic faceplate.

BACKGROUND

Holographic optical elements can be fabricated in various ways to achieve various optical purposes. Work has been done on the use of holographic optical elements as viewing screens. For example, see the article by Dietrich Meyerhofer in Applied Optics, Vol. 12, No. 9, Sept. 9, 1973 at pages 2180 to 2184 entitled "Holographic and Interferometric Viewing Screens". Reference should also be made to American Journal of Physics 37:748 and Journal of the Optical Society of America 60:1635.

The performance of a display for viewing by an observer is limited by the brightness, contrast, and resolution of the image as perceived by a person at the viewing pupil. With the conventional ground glass screen, the brightness of the image in a particular portion of the screen varies with the viewer's position. As perceived from the viewer's position at a particular point in the viewing pupil, the screen is not at the same brightness over the whole area. The distribution of light is dependent upon the viewer's position within the viewing pupil. This type of distribution of light on the screen makes it difficult for the viewer to observe all parts of the viewing screen and reliably extract information therefrom. Therefore, in many cases a screen of uniform or distribution controlled brightness is desirable. Furthermore, it is desirable to be able to define a viewing pupil through which the majority of the light from the display screen is delivered.

Such control can be achieved by the use of a properly constructed holographic element, such as is disclosed in the patent application filed by Kenneth C. Johnson entitled "Directional Diffusing Screen" Ser. No. 270,159, Filed June 3, 1981, now U.S. Pat. No. 4,372,639, the entire disclosure of which is incorporated herein by this reference.

When the viewing pupil is in a direct line from the source, the light which passes through the holographic optical element without diffraction, called zero-order light, is also visible at the exit pupil so as to degrade the performance of the diffusing screen. Although theoretically the diffusing screen can diffract up to 100% of the incoming light, the practical devices and empirical results suggest that a substantial portion may not be diffracted and diffused by the holographic optical element so that the holographic optical element directional diffusing screen will have a zero-order light problem, without taking means to alleviate that problem. In the above-identified Kenneth C. Johnson invention, the holographic optical element diffusing screen had its exit pupil positioned away from the zero-order light beam. Thus, the exit pupil did not have that unwanted direct illumination problem, but the zero-order light illuminates the space in which the viewer is located, to increase the ambient light level, which in many cases degrades the quality of the viewing. This also creates a visual hazard for a viewer who could inadvertently look at the screen from this zero-order region.

A related problem, which is susceptible to a similar solution, is found in multicolor displays. A multicolor display (as viewed by a holographic optical element diffusing screen such as is described in the Kenneth C. Johnson invention) diffracts different colors at different angles in the holographic optical element, in accordance with the well known laws of diffraction. This results in different viewing pupils for different colors. When two primary colors are used, they can both be seen only where the two viewing pupils overlap. Such presents a restriction in usability.

SUMMARY

In order to aid in the understanding of this invention it can be stated in essentially summary form that it is directed to a diffraction optics diffusing screen which employs in combination a transmission holographic optical element diffusing screen together with an angularly oriented fiber optic faceplate so that zero-order light is absorbed in the faceplate and multicolor light is redirected for enhanced viewing at the viewing pupil.

It is thus a purpose and advantage of this invention to provide a diffraction optics diffusing screen which suppresses the zero-order light to separate it from both the viewing pupil and the viewer's space to reduce ambient lighting to enhance viewing. It is another purpose and advantage of this invention to provide such a diffraction optics diffusing screen which redirects the separately diffracted colors of multicolor light so that the viewing pupil for each of the colors substantially overlaps. It is a further advantage and purpose of this invention to provide a diffraction optics diffusing screen which is a single structure comprised of a transmission hologram optical element diffusing screen joined with an angularly oriented fiber optic faceplace.

Other purposes and advantages of this invention will become apparent from a study of the following portion of the specification, the claims and the attached drawings.

BRIEF DESCRIPTION OF THE DRAWINGS

FIG. 3 is a sectional view through a transmission holographic optical element diffusing screen in association with an angularly oriented fiber optic faceplate, to form the diffraction optics diffusing screen in accordance with this invention.

FIG. 5 is a section similar to FIG. 3 showing the manner in which the diffraction optics diffusing screen of this invention brings together two separately diffracted color images.

DETAILED DESCRIPTION OF THE INVENTION

Figure 1:
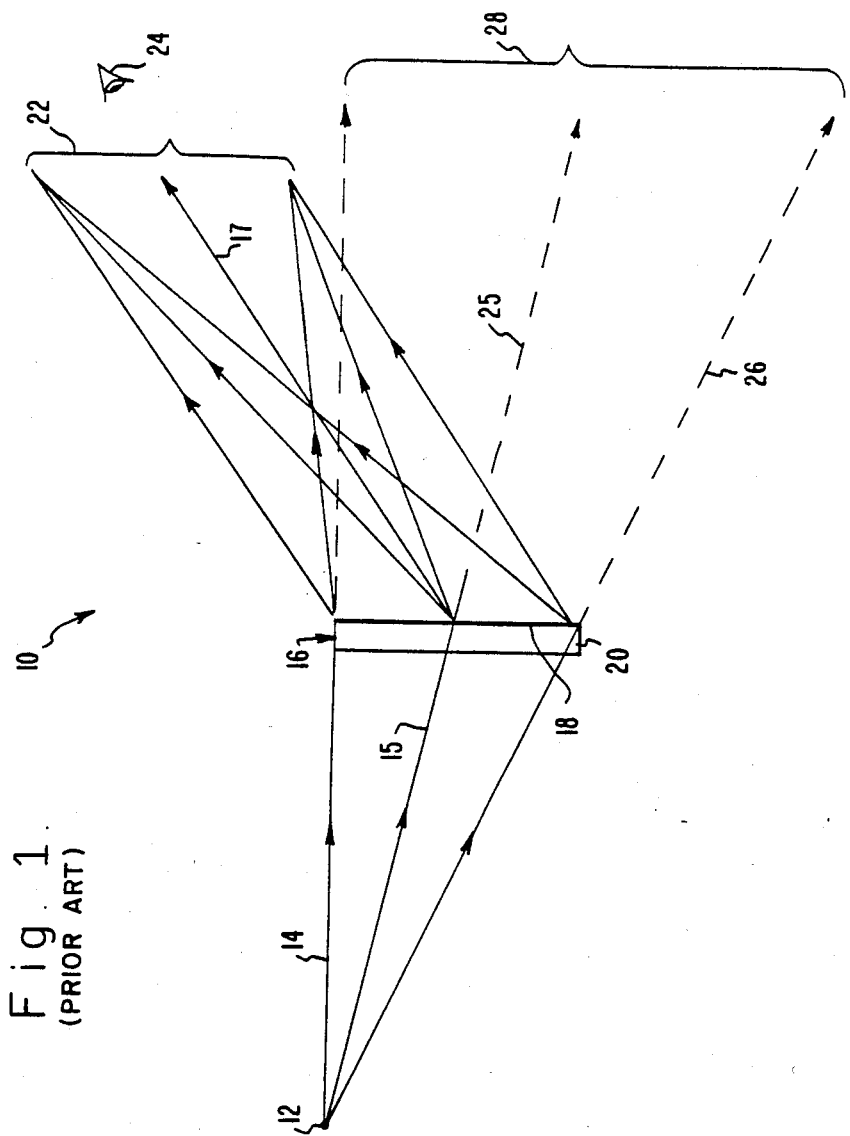
FIG. 1 is a schematic side elevational view of a directional diffusing screen and its associated principal optical paths.

FIG. 1 illustrates optical system 10 in which a point light source 12 projects a light beam 14 through transmission holographic optical element 16. For the preferred embodiment of FIGS. 1–4, the beam 14 is monochromatic or narrow band and usually carries information therein in the form of lateral or temporal modulation. Holographic optical element 16 is a gelatin film 18 mounted on a supporting substrate 20, such as optical glass. The manner of exposure and development of the holographic optical element 16 is described with respect to FIG. 2. The holographic optical element 16 carries therein diffraction elements which cause diffraction of the beam 14 so that the beam is diffused and is spread across the viewing exit pupil 22 where it is seen by observer 24. Most of the light in beam 14 is diffused by holographic optical element 16 and directed into the exit pupil 22. However, a portion of the image light is undiffracted by holographic optical element 16 and passes straight through to become the undiffracted zero-order beam 26 which is seen across the broad zero-order pupil 28. Such zero-order light degrades the performance of the diffusing screen by illuminating the area around pupil 22 to thus reduce contrast. Although theoretically the diffusing screen can diffract up to 100% of the incoming light, the practical devices and empirical results suggest that a substantial portion may not be diffracted and will be in the zero-order beam and will be visible at the zero-order pupil 28, unless the zero-order light is otherwise accommodated.

Figure 2:
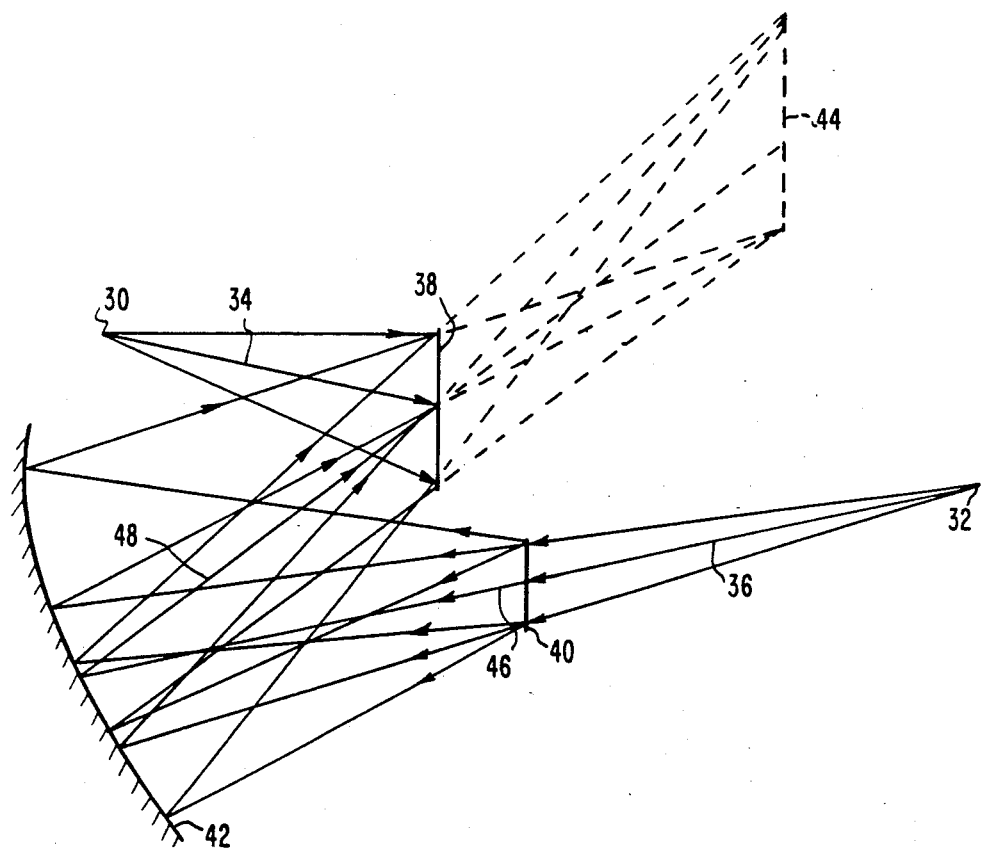
FIG. 2 is a schematic side elevational optical diagram showing the construction optics for the directional diffusing screen of FIG. 1.

FIG. 2 illustrates one method by which directional diffusing screen 16 can be made. Point source 30 and point source 32 provide focussed coherent monochromatic light. Preferably sources 30 and 32 are from the same source optically directed as shown. Holographic sensitive plate 38 is to be exposed and developed to become the directional diffusing screen 16. Holographic sensitive plate 38 can be any conventional holographic recording medium and technique. A particular example is described in more detail in application for U.S. patent application Ser. No. 137,343, filed Apr. 4, 1980 by I. J. Kurland and Andre Graube. In that disclosure, the chemical character of the plate, its exposure and its development are described in detail. That disclosure is incorporated herein in its entirety by this reference. In order to provide suitable exposure, interfering wavefronts within the plate cause a latent image which can be developed to cause minute internal variations in refactive index and/or absorption. Point source 30 illuminates plate 38 and represents the direction of incoming light from the source (such as source 12) which will later illuminate the developed directional diffusing screen 16. The central ray 34 from point source 30 to the plate 38 corresponds to the central ray 15 to the screen 16 in FIG. 1.

Point source 32 illuminates diffusing screen 40 which is of ordinary characteristics. For example, it may be of ground glass. If the ground glass is uniform, it presents a uniformly illuminated screen. If other illumination distribution is desired, such can be accomplished by controlling the lateral illumination density of screen 40. The image of the illuminated diffusing screen 40 is focused by mirror 42 toward an image plane 44, which represents the pupil 22 in FIG. 1. Typically mirror 42 images point source 32 at the region of plate 38. The central ray 46 from the center of diffusing screen 40 reflects on projection mirror 42. The reflected ray 48 impinges on the center of holographic sensitive plate 38 while directed toward image plane 44. The illumination from diffusing screen 40 and from point source 30 cause the production of a latent image in holographic sensitive plate 38. This plate is then developed to become directional diffusing screen 16. When the directional diffusing screen 32 is illuminated from a monochromatic source 12, the image seen at viewing exit pupil 22 is the image of ground glass diffusing screen 40. Due to the uniform illumination of the diffusing screen 40 in the preferred embodiment, illumination is uniform across pupil 22. If desired, diffusing screen 40 may not be of uniform diffuse illumination, but some other energy distribution may be employed to produce a corresponding energy distribution at the exit pupil 22.

This construction results in an energy envelope of the illumination leaving holographic optical element 16 in such a way that each of the vectors in the energy envelope is directed in the desired manner toward the viewing pupil 22. The directional diffusing screen 16 thus has the property that little energy is dissipated outside of the desired illumination toward the viewing pupil. In addition, the central ray 17 is directed at an angle away from the central ray 15 to such an extent that the viewing pupil 22 is completely away from the envelope 26 of zero-order beam with center ray 25. Thus, the observer 24 does not see, from his position, any of the direct zero-order beam.

In accordance with this invention, the zero-order light passing through the transmission holographic diffusing screen 16 can be suppressed in a fiber optic faceplate. Fiber optic faceplate 48, see FIG. 3, is a cross-sectional slab angularly cut from a bundle of many microscopically thin optical fibers which are adhesively secured to each other. As is seen in FIG. 3, the plurality of optical fibers, including optical fibers 50, 52, 54 and 56 are cemented together with cement 60. In actuality, these fibers are cemented together in a long bundle and a slab is angularly cut therefrom to form the fiber optic faceplate 48. When the light entering each fiber is at a small enough angle to the fiber center line, the light propagates through the fiber by repetitive total internal reflections off of the core-cladding interface, while light entering at too steep an angle partially passes through the interface causing the partially-reflected ray to quickly die out. The multiple reflection in the fiber serves to scramble the output diffuse light cone.

In FIG. 3, that portion of the center ray 15, which is not diffracted in holographic diffusing screen 16 continues as the center ray 25 of the zero-order light. This center ray is at too steep an angle to totally reflect within the optical fiber 54 but passes through the cladding sidewall and is absorbed in interfiber material 60 without passing out the right side of the faceplate 48. Thus, the zero-order light is absorbed. That portion of the incoming signal represented by center ray 15, which is diffracted in the holographic optical element diffusing screen 16, is diffused therein and is at a small enough angle with respect to the walls of the fibers in the fiber optic faceplate that it is totally reflected and is directed out of the output side of the fiber optic faceplate, see center ray 17 which is on the fiber center line. Actually, the output is a diffuse light cone with a total cone angle of 2 theta equal to twice the angle theta which is the angle at which the farthest edge of the input diffuse light cone is off the center line of the optical fibers in the fiber optic faceplate. This effect contributes to uniformity of illumination in the viewing pupil. By designing the center ray of the input diffuse light cone to be parallel to the central axis of the optical fiber, the orientation and angular width of the input diffuse light cone is preserved in the output diffuse light cone.

Figure 4:
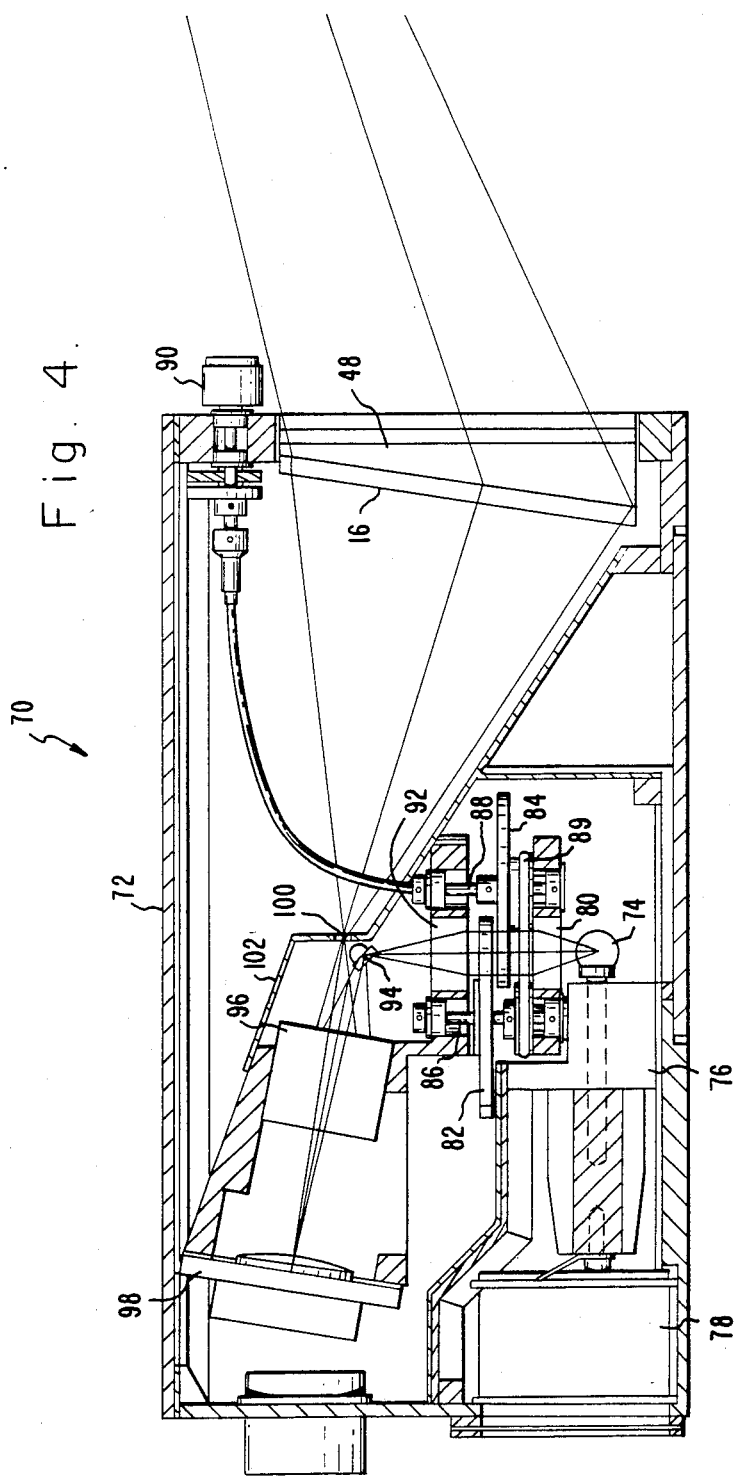
FIG. 4 is a longitudinal section through a display device incorporating the diffraction optics diffusing screen of this invention.

FIG. 4 illustrates display 70 which incorporates the diffusion optics diffusing screen of this invention. Display 70 includes housing 72 which provides a structural support, protective enclosure and light constraining cover. Light source 74 is located within housing 72 and is mounted upon base 76. Fan 78 blows cooling air over the lamp and its base. The light output from lamp 74 is reflected upward and is focused by condensor lens 80. A pair of circular tapered neutral grey filtered discs 82 and 84 is positioned in the upward optical path. Filters 82 and 84 are respectively mounted on shafts 86 and 88 so that they can rotate different density areas into the light path. The two shafts are coupled together by means of belt 89 so that the filter discs rotate together. In view of the fact they are both tapered and complementary and rotate in opposite directions, the filter density is uniform over the entire optical area. Rotation of the discs changes the total density of the pair of filter discs. Control knob 90 permits external adjustment of the control. Lenses in lens housing 92 focus the point source of light 74 on mirror 94, which reflects the beam through a set of lenses in lens housing 96, and delivers the illumination to liquid crystal display 98.

The liquid crystal display is such that the reflection therefrom may either be specular or diffuse depending upon the energization thereof. Information is provided to the liquid crystal display by way of selective electrical energization. In this way information is imparted to the light beam. The image on liquid crystal display 98 is focused by the lenses in housing 96 through pinhole 100 adjacent to mirror 94. Pinhole 100 is in wall 102 which completely separates housing 72 into two zones. Below and to the left of wall 102 is the light source, most of the lenses and the liquid crystal display which has some diffuse output. The small size of the pinhole 100 permits transmission of the specularly reflected information and very little of the diffuse illumination. Thus, substantially only the information-containing specularly reflected light is projected through the pinhole 100. To the right of wall 102 substantially only the image light and not the diffuse light is found. The transmission holographic optical element diffusing screen 16 and its companion fiber optic faceplate 48 are positioned at the right end of housing 72. This combination is the diffraction optics diffusing screen of this invention with its zero-order suppression. The viewing exit pupil 22 and observer 24 are to the right of FIG. 4.

The transmission holographic optical element 16 can diffract light from a red-green image source to form a two color signal beam at the viewing pupil. However, with the different wavelengths of the light in the two signals, a different amount of diffraction for each color is achieved in the transmission hologram optical element 16. This is illustrated in FIG. 5 where the center ray 104 of the red beam and the center ray 106 of the green beam are diffracted in holographic optical element 16. The difference in the diffraction of the two colors in the holographic optical element is represented by red cone 108 and green cone 110. The diffraction angles of these cones are such that they are both within the total internal reflection critical angle of the optical fiber 54 so that they are both totally reflected within the optical fiber. The fiber optic faceplate 48 scrambles these two light cones 108 and 110 about its central axis and effectively increase the size of the usable exit pupil. The reason for this scrambling is that the exit cone total angle from the fiber optic faceplate 48 is 2 theta equally on both sides of the fiber center line 112, when the input half cone angle $theta_1$ for the red cone and $theta_2$ for the green cone are equal, as shown in FIG. 5. When $theta_2$ is larger than $theta_1$, then the scrambled cone at the output of the faceplate is 2 $theta_2$. If the red cone half angle $theta_1$ is larger than the green cone half angle $theta_2$, then the scrambled light cone adjacent the output of the fiber optic faceplate is 2 $theta_1$. Thus, if the input cones are adjusted with respect to faceplate so that $theta_1$ equals $theta_2$, then the two cones will be perfectly overlapped in the output cone 114. Thus, the viewing pupil for both of the colors is substantially the same. The scrambling of the two colors in the fiber optic faceplate brings the two cones out at substantially the same angle so as to project the two color images substantially into the same viewing pupil.

This invention has been described in its presently contemplated best mode and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An optical apparatus comprising:
   a holographic optical element possessing diffractive means therein by means of which a portion of a beam of light incident upon any particular point on said holographic optical element from a designated direction is diffusely diffracted toward a predetermined exit pupil so that light diffracted from said incident beam by said holographic optical element is substantially directed toward and illuminates said exit pupil with a selected intensity distribution; and
   a fiber optic faceplate having light absorbing material and a plurality of substantially parallel optical fibers therein, said fibers positioned with respect to said holographic optical element so that said diffracted light propagates therethrough, the angle of diffracted light from said holographic optical element being sufficiently divergent from the incident light thereon that any undiffracted incident light impinging upon said fiber optic faceplate passes through said fibers and is absorbed in said light absorbing material.

2. The optical apparatus of claim 1 wherein said fiber optic faceplate causes scrambling of the diffracted light such that the illuminated cone from each fiber of said fiber optic faceplate has a total included angle of 2 theta where theta is the angle between the optical axis of said fiber optic faceplate and the farthest side of the incoming diffracted light cone into said fiber optic faceplate.

3. The optical apparatus of claim 2 wherein the incident light onto said holographic optical element is of more than one color so that the differently diffracted colors in the holographic optical element are substantially scrambled in said fiber optic faceplate to provide all colors substantially over the entire exit pupil.

4. An optical apparatus comprising:
   a holographic optical element having a surface and having diffractive means therein, said diffractive means receiving incoming light impinging on the surface of said holographic optical element and diffracting a portion of said light into a diffused bundle having a viewing pupil, said light having a central ray, said central ray in said diffracted light forming a different angle to said surface than said central ray in said incoming light; and a fiber optic faceplate having a plurality of optical fibers therein, each being substantially parallel to each other and having said fibers directed substantially parallel to an axis, said fiber optic faceplate being oriented so that said axis thereof lies substantially parallel to said central ray in said diffracted light so that the diffused light bundle from said optical fibers of said fiber optic faceplate is directed at an exit pupil.

5. The optical apparatus of claim 5 wherein said fiber optic faceplate includes light absorbing material and said diffractive means in said holographic optical element diffracts light through a sufficient angle so that only the light diffracted by said holographic optical element is reflected within the optical fibers in said faceplate and thereby directed towards said exit pupil, whereas any incoming light which is not diffracted passes through the optical fibers at an angle less than the critical angle so that the undiffracted light is absorbed in said light absorbing material.

6. An optical system comprising:
   an information carrying screen;
   a holographic optical element;
   means for projecting light carrying information from said screen onto said holographic optical element, said projection means providing an incoming central ray from said information carrying screen to said holographic optical element;
   diffraction means in said holographic optical element for diffusely diffracting a portion of the incoming light toward a viewing pupil; and
   a fiber optic faceplate having light absorbing material and a plurality of substantially parallel optical fibers therein positioned between said holographic optical element and said viewing pupil, said fibers positioned so that diffracted light from said information screen propagates through said fibers and is viewable at said viewing pupil and light undiffracted by said holographic optical element passes through said fibers and is absorbed in said light absorbing material.

7. The optical system of claim 6 wherein said holographic optical element has a surface and said incoming central ray impinges upon said surface at a point at a predetermined angle and said optical fibers of said fiber optic faceplate are angularly directed away from said central ray at an angle greater than the critical angle.

* * * * *